(12) United States Patent
Lin et al.

(10) Patent No.: US 7,972,042 B2
(45) Date of Patent: Jul. 5, 2011

(54) LIGHT GUIDE AND ILLUMINATION DEVICE HAVING SAME

(75) Inventors: Mei-Chun Lin, Taipei Hsien (TW); Chun-Hsiang Huang, Taipei Hsien (TW); Kuang-Wei Lin, Taipei Hsien (TW); Kuan-Ting Chen, Taipei Hsien (TW); Hsin-Tsung Yeh, Taipei Hsien (TW); Wei-Hsiu Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 265 days.

(21) Appl. No.: 12/428,444

(22) Filed: Apr. 22, 2009

(65) Prior Publication Data

US 2010/0110729 A1    May 6, 2010

(30) Foreign Application Priority Data

Oct. 30, 2008    (CN) .......................... 2008 1 0305293

(51) Int. Cl.
*F21V 5/04* (2006.01)
*F21V 5/00* (2006.01)

(52) U.S. Cl. .............. 362/335; 362/311.03; 362/311.06; 362/326; 362/336

(58) Field of Classification Search .................. 362/257, 362/311.01, 311.03, 311.04, 311.05, 311.06, 362/326, 335, 336, 339, 340
See application file for complete search history.

(56) References Cited

U.S. PATENT DOCUMENTS 7,828,471 B2 * 11/2010 Lin ............................... 362/555
* cited by examiner

*Primary Examiner* — David N Spector
(74) *Attorney, Agent, or Firm* — Zhigang Ma

(57) ABSTRACT

A light guide is a quarter of cylinder in shape and includes a cylindrical emitting surface, an incident surface adjacent to and facing away from the cylindrical emitting surface, and a connecting surface connecting the cylindrical emitting surface and incident surface. The light guide defines five a number of grooves in the incident surface. Each groove is bounded by two surfaces. The inclined angle of the two surface is designed to satisfy a set of conditions to improve light uniformity of the cylindrical emitting surface.

9 Claims, 4 Drawing Sheets

LIGHT GUIDE AND ILLUMINATION DEVICE HAVING SAME

BACKGROUND

1. Technical Field

The present disclosure relates to light guides and, particularly, to a light guide and an illumination device using the light guide.

2. Description of Related Art

Light guides which are a quarter of a cylinder in shape are used in illumination devices to allow the illumination devices to be compactly installed into an intersectional corner between two orthogonal surfaces, e.g., a corner between a sidewall and a ceiling. Such a light guide typically includes two orthogonal planar surfaces and a cylindrical surface connecting the planar surfaces. In use, a light source is placed in front of one of the planar surfaces (referred to as the incident surface) and illuminates the light guide, which directs light rays to emit out from the cylindrical surface (referred to as the emitting surface). One of the challenges of utilizing such a light guide in an illumination device is: light rays entering the light guide at a point far away from the planar surface without the light source (referred to as the connecting surface) may experience total internal reflection on the emitting surface and are either gathered to emit out from a zone of the emitting surface near the connecting surface or absorbed by the connecting surface, decreasing light uniformity of the emitting surface and light usage efficiency of the illumination device.

Therefore, it is desirable to provide a light guide and an illumination device having the same, which can overcome the above-mentioned problems.

DETAILED DESCRIPTION

Figure 1:
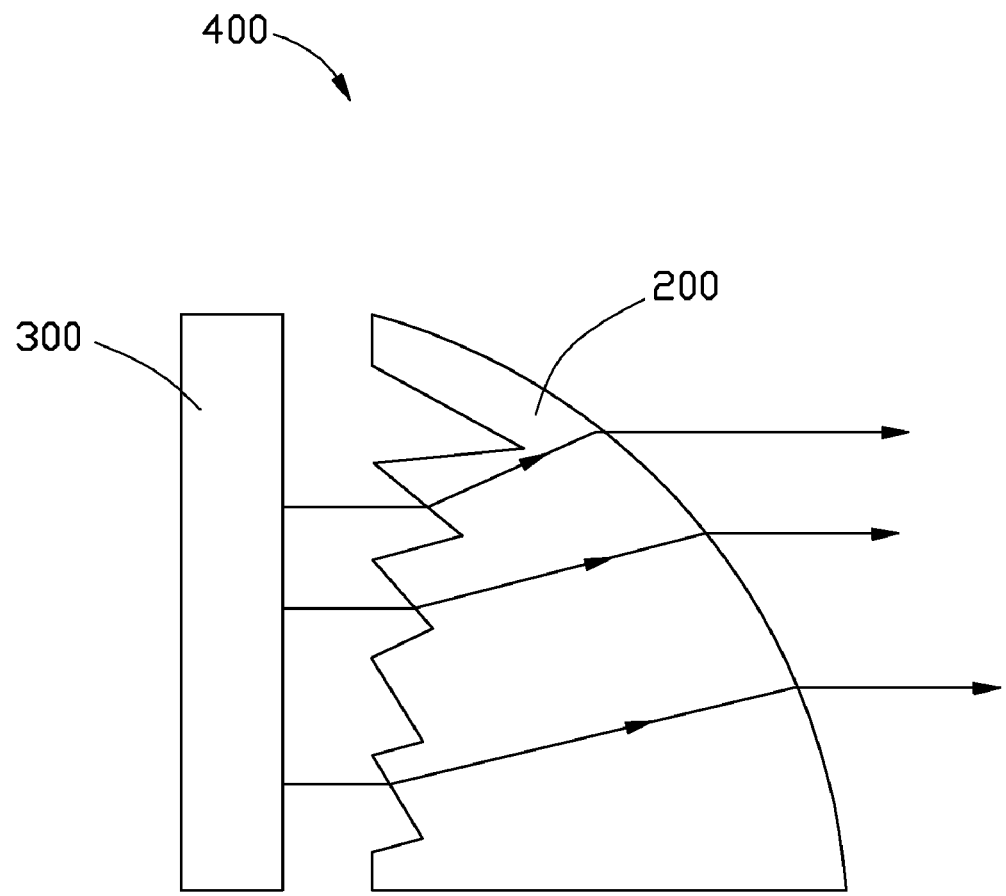
FIG. 1 is a planer, schematic view of an illumination device, according to an exemplary embodiment.

Referring to FIG. 1, an illumination device 400, according to an exemplary embodiment, includes a light source 300 and a light guide 200.

Figure 2:
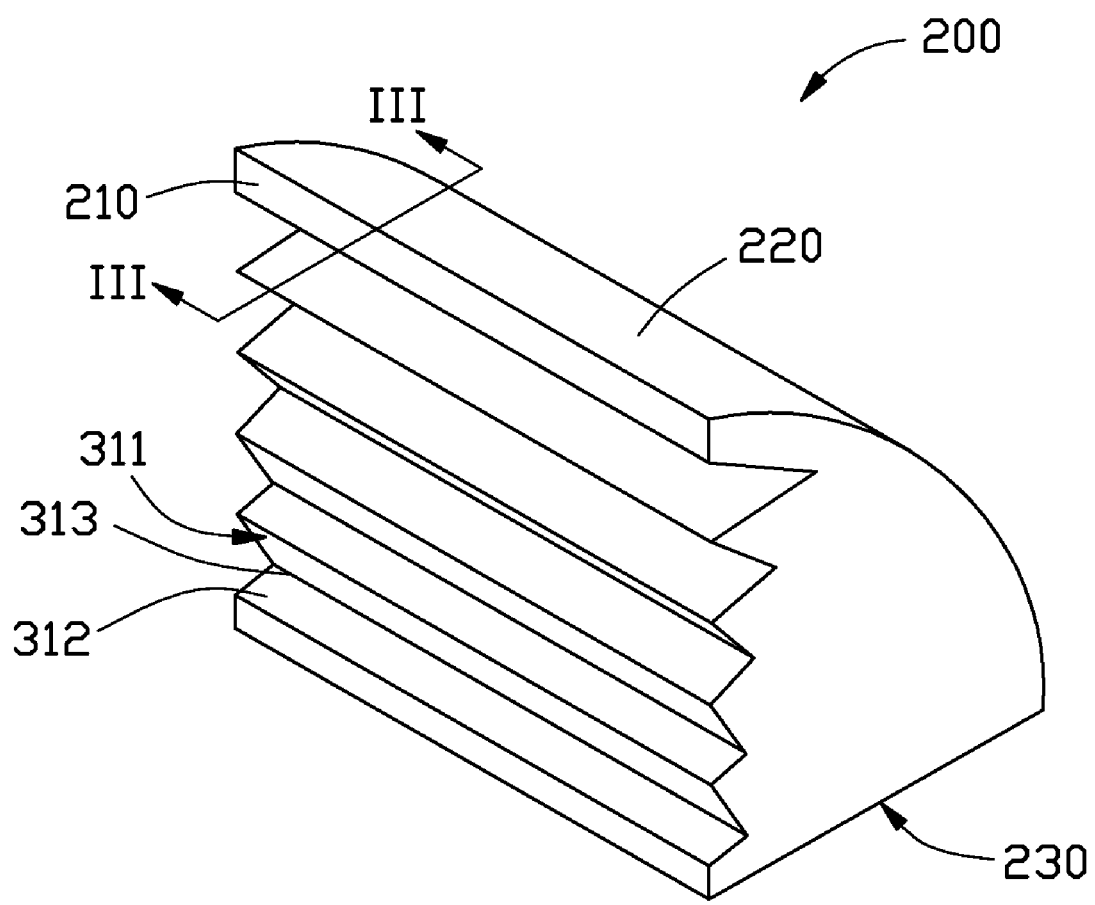
FIG. 2 is an isometric, schematic view of a light guide of the illumination device of FIG. 1.
Figure 3:
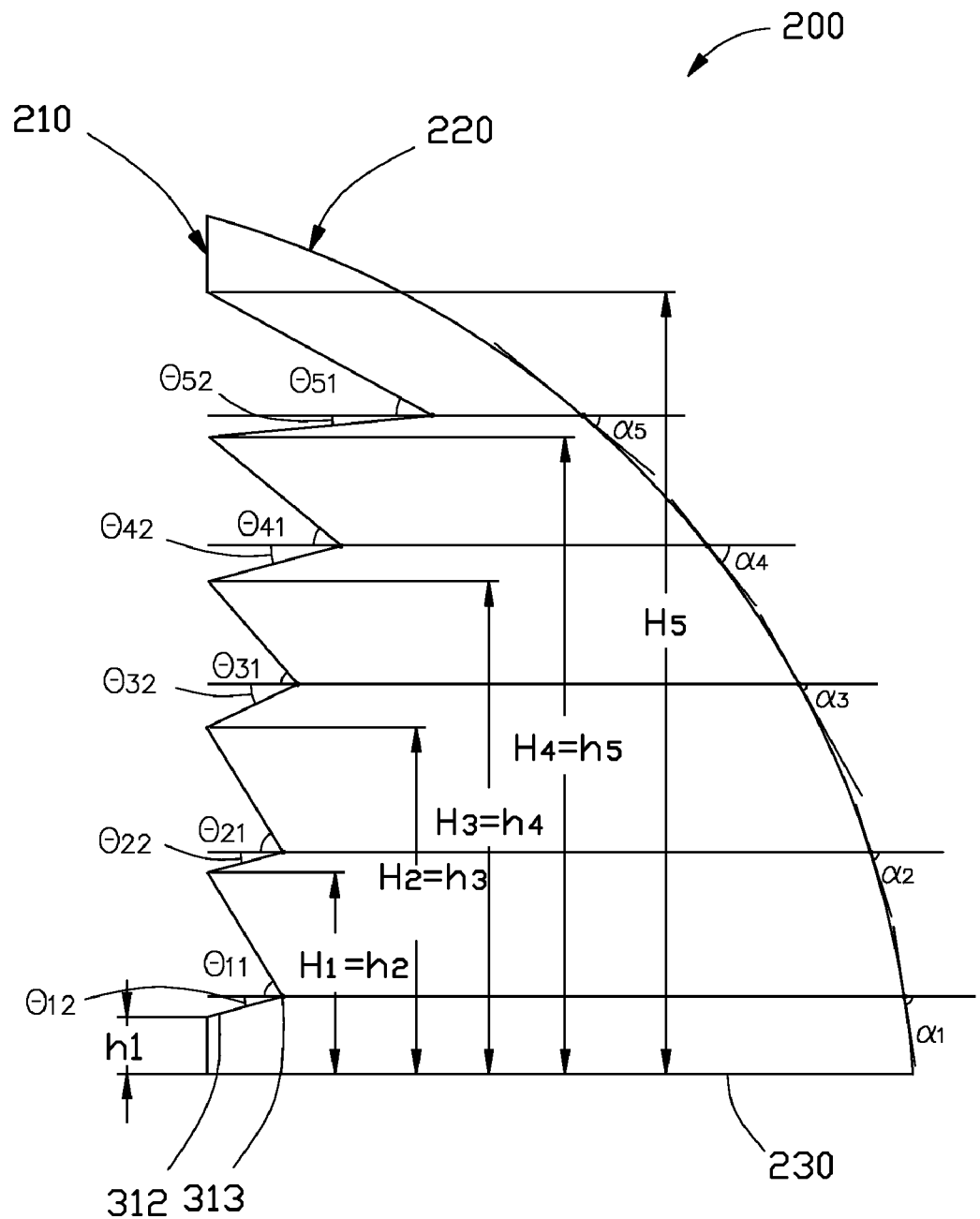
FIG. 3 is an isometric, schematic view taken along the line III-III of FIG. 2.

Also referring to FIGS. 2~3, the light guide 200 is substantially a quarter of a cylinder in shape and includes an incident surface 210 (e.g., one side surface of the quarter of cylinder), an emitting surface 220 (e.g., the cylindrical surface of the quarter cylinder), and a connecting surface 230 (e.g., the other side planar surface of the quarter cylinder) connecting the incident surface 210 and the emitting surface 220. The light guide 200 defines five grooves 310 in the incident surface 210. Each groove 310 extends substantially along the axial direction of the light guide 200 and is bounded by a first surface 311 facing toward the connecting surface 230 and a second surface 312 facing away from the connecting surface 230, and satisfies the following formulas:

$$-0.58\alpha_i + 59° < 90° - \theta_{i1} < -0.54\alpha_i + 65°; \text{ and}$$

$$5° \leq \theta_{i2} < 25°,$$

where the five grooves 310 are ordered from the connecting surface 230, $\theta_{i1}$ is an acute included angle between the first surface 311 of the i-th order groove 310 and the connecting surface 230, $\theta_{i2}$ is an acute included angle between the second surface 312 of the i-th order groove 310 and the connecting surface 230, and $\alpha_i$ is an acute included angle between the emitting surface 220 and a plane passing through an intersection 313 between the first surface 311 and the second surface 312 of the i-th order groove 310 and parallel to the connecting surface 230.

The light guide 200 can be made from plastic such as polymethyl methacrylate (PMMA), polycarbonate (PC), or silicone. In other embodiments, the light guide 200 can be made from glass.

The light source 300 is placed in front of the incident surface 210, and is typically a Lambertian source such as a light emitting diode (LED) panel. Thereby, the light source 300 can emit parallel light rays to the incident surface 200. In other embodiments, the light source 300 can be a light tube.

To provide better understanding of the light guide 200, a detailed example of the light guide 200 is given below, but it should be noted that the light guide 200 is not limited by the example. Listed below are the symbols used in the detailed example:

$H_i$: the longest distance between the first surface 311 of the i-th order groove 310 and the connecting surface 230; and $h_i$: the shortest distance between the second surface 312 of the i-th order groove 310 and the connecting surface 230.

EXAMPLE

Table shows values of the light guide 200 of the example.

TABLE

| i | $\theta_{i1}$ | $\theta_{i2}$ | $\alpha_i$ | $H_i$ (mm) | $h_i$ (mm) |
|---|---|---|---|---|---|
| 1 | 60° | 5° | 80° | 0.37 | 0.07 |
| 2 | 72° | 5° | 75° | 0.67 | 0.37 |
| 3 | 60° | 7° | 60° | 0.97 | 0.67 |
| 4 | 48° | 12° | 45° | 1.27 | 0.97 |
| 5 | 35° | 17° | 20° | 1.57 | 1.27 |

By satisfying the Table, emergence angles of parallel light rays entering the i-th groove 310 and passing the light guide 200 are 7°, 2.5°, 2.5°, 2.5°, and 4°, which would be 5°, 10°, 17°, 30°, and 70° correspondingly if no grooves were defined in the incident surface 210. That is, light rays are guided to emit out from the emitting surface 220 in a more uniform manner.

Figure 4:
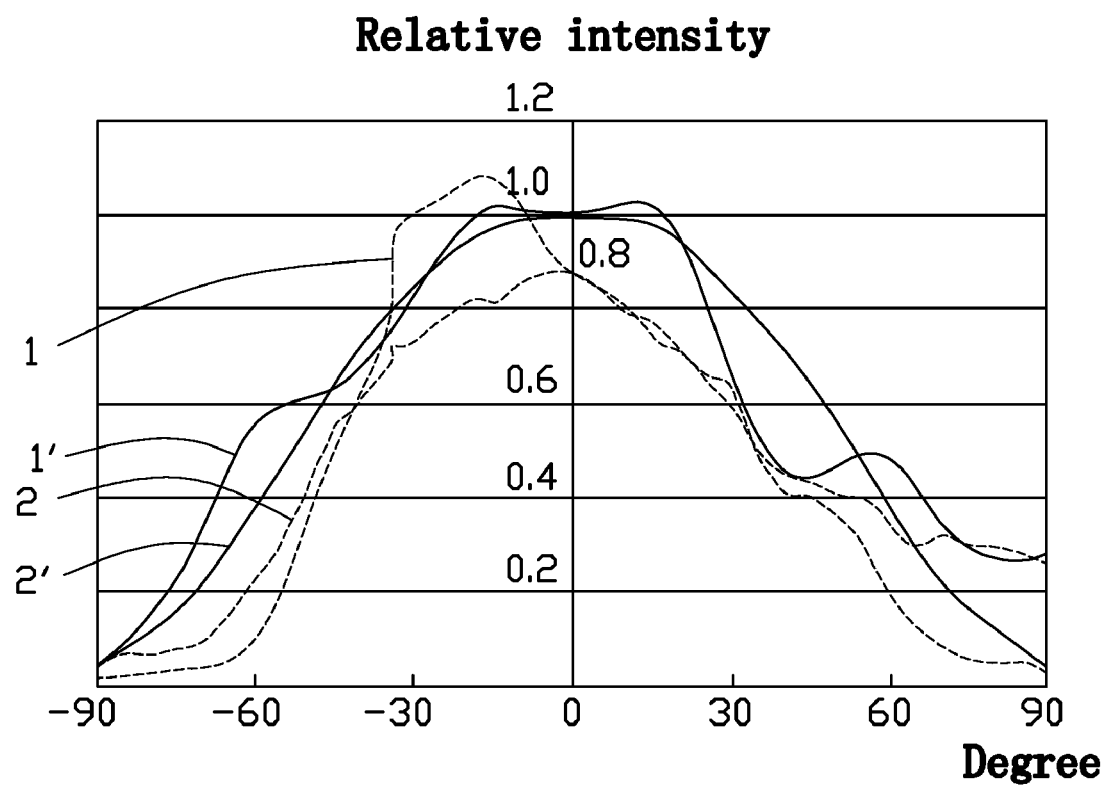
FIG. 4 is a graph showing light intensity distributions of the light guide of FIG. 3 and a light guide of a related art and improved results by the disclosed embodiments.

To prove that light uniformity is improved by the light guide 200, light intensity distribution of the light guide 200 and the light guide discussed in the background were simulated. As illustrated in FIG. 4, the horizontal axis presents incident angle of light rays onto the emitting surface 230, the vertical axis presents relative light intensity, curves 1, 2 respectively represent light intensity distribution in the circumferential direction and the axial direction of the light guide of background, and curves 1', 2' respectively represent light intensity distribution in the circumferential direction and the axial direction of the light guide 200. It can be seen from FIG. 4 that light uniformity is improved.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light guide comprising:
   a cylindrical emitting surface;
   an incident surface adjacent to and substantially facing away from the cylindrical emitting surface; and
   a connecting surface connecting the cylindrical surface and the incident surface;
   wherein the light guide defines a plurality of grooves in the incident surface, each groove extending substantially along a direction parallel to the cylindrical surface and being bounded by a first surface substantially facing to the connecting surface and a second surface substantially facing away from the connecting surface, the grooves satisfying the following formulas:

$$-0.58\alpha+59°<90°-\theta_1<-0.54\alpha+65°; \text{ and}$$

$$5°\leq\theta_2<25°,$$

where $\theta_1$ is an acute included angle between each first surface and the connecting surface, $\theta_2$ is an acute included angle between each second surface and the connecting surface, and $\alpha$ is an acute included angle between the emitting surface and a plane passing through the intersection between each first surface and a corresponding second surface and parallel to the connecting surface.

2. The light guide as claimed in claim 1, wherein the light guide is made from a material selected from the group consisting of plastic and glass.

3. The light guide as claimed in claim 1, wherein the light guide is made from a material selected from the group consisting of polymethyl methacrylate, poly carbonate, and silicone.

4. The light guide as claimed in claim 1, wherein the plurality grooves comprise five grooves, the five grooves being ordered from the connecting surface and being satisfying the following table:

| i | $\theta_{i1}$ | $\theta_{i2}$ | $\alpha_i$ | $H_i$ (mm) | $h_i$ (mm) |
|---|---|---|---|---|---|
| 1 | 60° | 5° | 80° | 0.37 | 0.07 |
| 2 | 72° | 5° | 75° | 0.67 | 0.37 |
| 3 | 60° | 7° | 60° | 0.97 | 0.67 |
| 4 | 48° | 12° | 45° | 1.27 | 0.97 |
| 5 | 35° | 17° | 20° | 1.57 | 1.27 | wherein i is the order of the grooves, $\theta_{i1}$ is the acute included angle between the first surface 311 of the i-th order groove and the connecting surface, $\theta_{i2}$ is the acute included angle between the second surface of the i-th order groove and the connecting surface, and $\alpha_i$ is an acute included angle between the emitting surface and the plane passing through the intersection between the first surface and the second surface of the i-th order groove and parallel to the connecting surface.

5. An illumination device comprising:
   a light guide comprising
      a cylindrical emitting surface;
      an incident surface adjacent to and substantially facing away from the cylindrical emitting surface; and
      a connecting surface connecting the cylindrical surface and the incident surface; and
   a light source placed in front of the incident surface;
   wherein the light guide defines a plurality of grooves, each groove extending substantially along a direction parallel to the cylindrical surface and being bounded by a first surface substantially facing to the connecting surface and a second surface substantially facing away from the connecting surface, the grooves satisfying the following formulas:

$$-0.58\alpha+59°<90°-\theta_1<-0.54\alpha+65°; \text{ and}$$

$$5°\leq\theta_2<25°,$$

where $\theta_1$ is an acute included angle between each first surface and the connecting surface, $\theta_2$ is an acute included angle between each second surface and the connecting surface, and $\alpha$ is an acute included angle between the emitting surface and a plane passing through the intersection between each first surface and a corresponding second surface and parallel to the connecting surface.

6. The illumination device as claimed in claim 5, wherein the light guide is made from a material selected from the group consisting of plastic and glass.

7. The illumination device as claimed in claim 5, wherein the light guide is made from a material selected from the group consisting of polymethyl methacrylate, poly carbonate, and silicone.

8. The illumination device as claimed in claim 5, wherein the plurality grooves comprise five grooves, the five grooves being ordered from the connecting surface and being satisfying the following table:

| i | $\theta_{i1}$ | $\theta_{i2}$ | $\alpha_i$ | $H_i$ (mm) | $h_i$ (mm) |
|---|---|---|---|---|---|
| 1 | 60° | 5° | 80° | 0.37 | 0.07 |
| 2 | 72° | 5° | 75° | 0.67 | 0.37 |
| 3 | 60° | 7° | 60° | 0.97 | 0.67 |
| 4 | 48° | 12° | 45° | 1.27 | 0.97 |
| 5 | 35° | 17° | 20° | 1.57 | 1.27 | wherein i is the order of the grooves, $\theta_{i1}$ is the acute included angle between the first surface 311 of the i-th order groove and the connecting surface, $\theta_{i2}$ is the acute included angle between the second surface of the i-th order groove and the connecting surface, and $\alpha_i$ is an acute included angle between the emitting surface and the plane passing through the intersection between the first surface and the second surface of the i-th order groove and parallel to the connecting surface.

9. The illumination device as claimed in claim 5, wherein the light source is selected from the group consisting of light emitting diode panel and light tube.

* * * * *